Patented Feb. 14, 1939

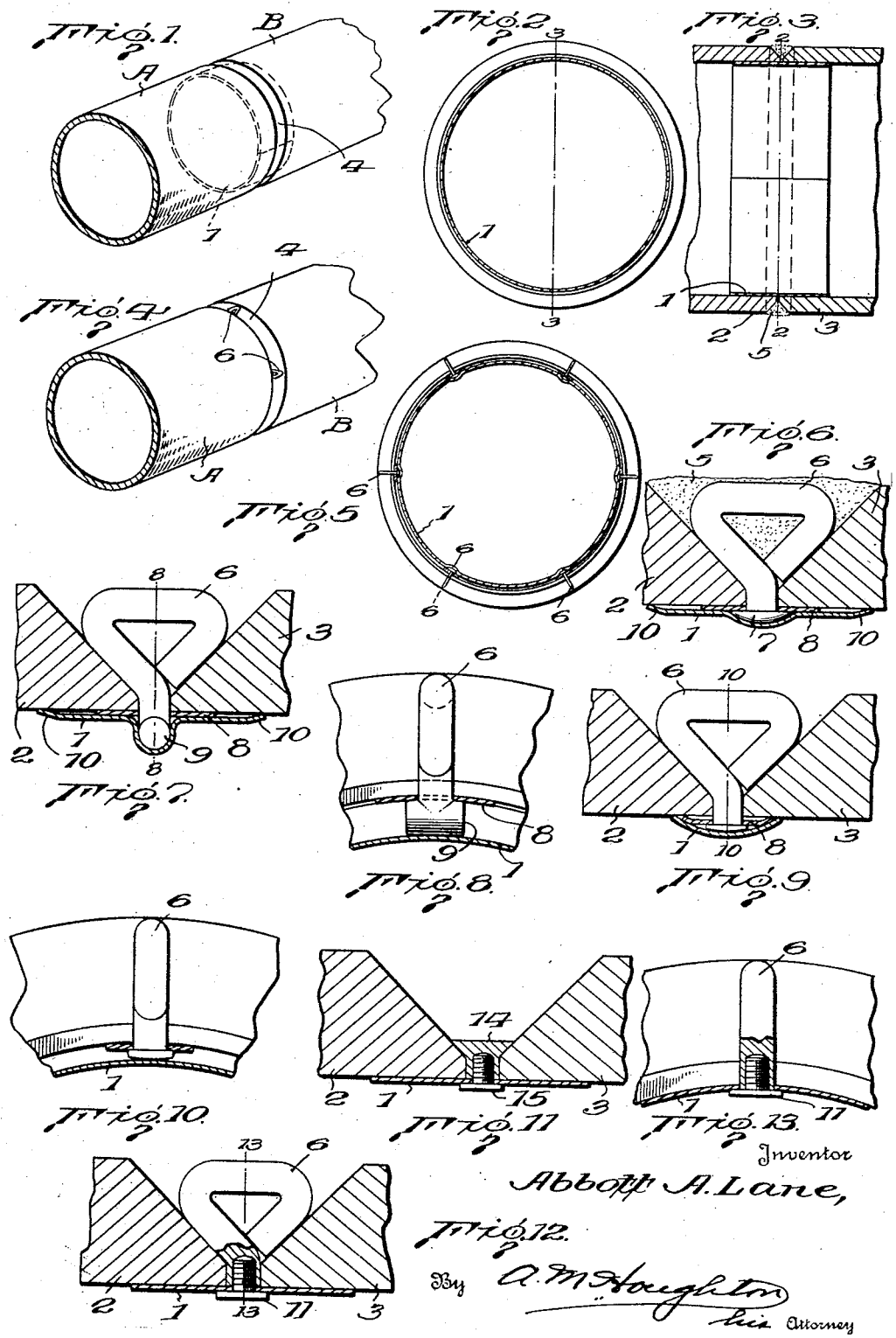

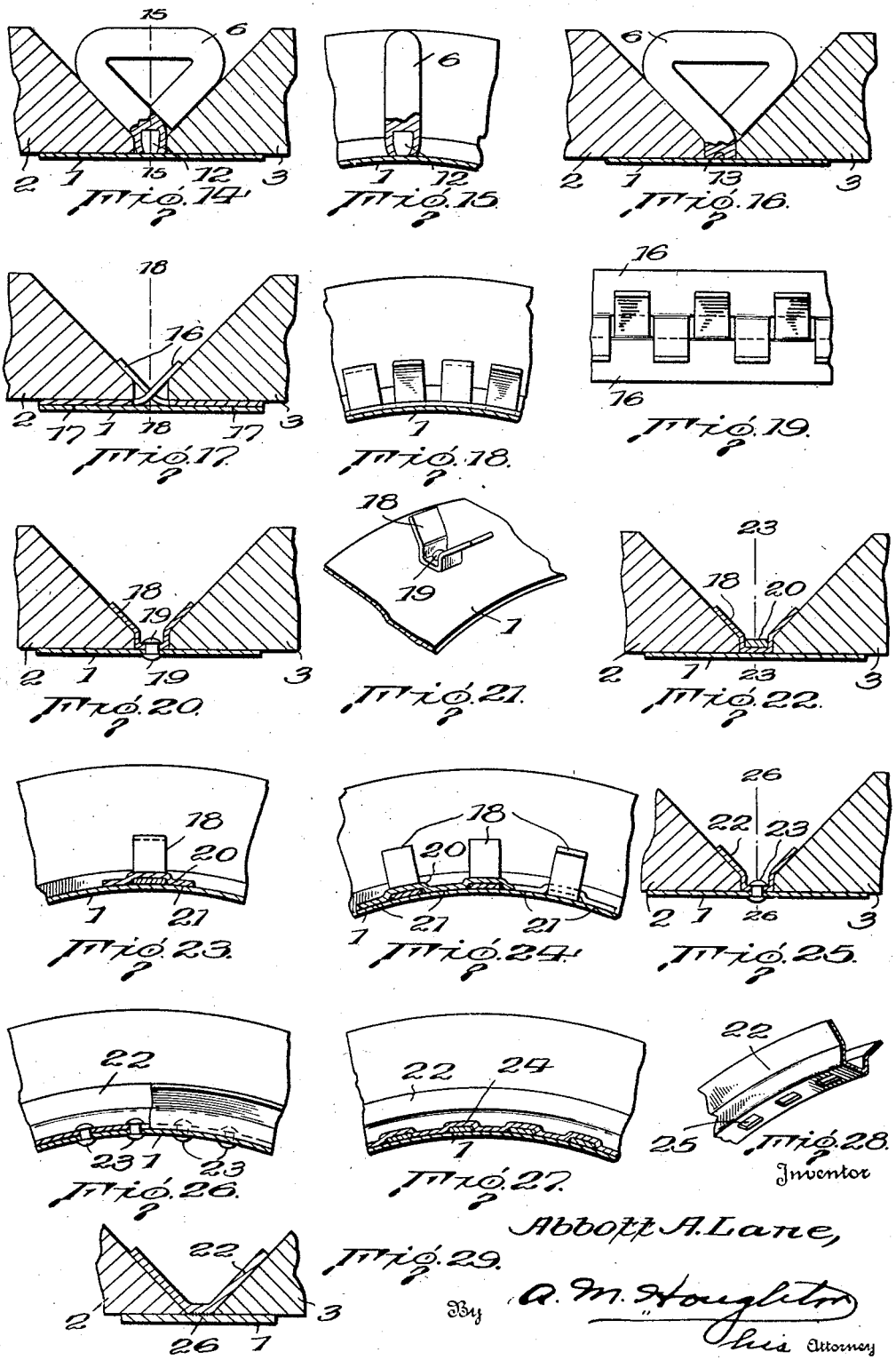

2,146,901

UNITED STATES PATENT OFFICE 2,146,901

BUTT WELDING METAL SHEETS, PIPES, OR TUBES AND THE LIKE

Abbott A. Lane, O'Hara Township, Allegheny County, Pa., assignor to Gulf Research & Development Company, Pittsburgh, Pa., a corporation of Delaware Application January 23, 1934, Serial No. 707,968

10 Claims. (Cl. 113—112)

This invention relates to butt welding metal sheets, pipes or tubes and the like; and it comprises a method of butt welding wherein the edges of the members to be joined are first beveled, then a thin welding strip of tungsten, molybdenum or other metal or alloy of considerably higher melting point than the material of the weld is positioned beneath and overlapping the edges to be joined, projecting portions of the strip engaging the beveled surfaces of the edges, the edges being then moved toward one another to bring them into substantially abutting relation to clamp the strip therebetween and to cause the strip to be pressed closely against the underside of the edges at the joint whereby a welding groove having a bottom is formed, and finally joining said edges by supplying welding material to said groove; and the invention further comprises a thin welding or backing strip of tungsten, molybdenum or other high melting point metal adapted to be positioned to overlap abutting edges of members to be butt welded, said strip being advantageously provided with centrally disposed projections extending transversely of the strip to frictionally engage the edges to be joined and for aligning and holding the strip closely against the abutting ends of the members to be joined; all as more fully hereinafter set forth and as claimed.

Heretofore, in the butt welding of metal sheets and tubes, difficulty has been experienced with the metal of the weld flowing through the joint and solidifying at the underside of the joint in rough icicle-like formations. These formations are frequently objectionable and have to be chipped off or ground away. They are particularly objectionable in sheet metal construction where the back of the welded joint must lie flat against a supporting member or framework and they are especially disadvantageous in pipe line constructions where they interfere with the flow of material through the pipe and obstruct the passage of cleaning devices such as "go-devils".

To obviate these difficulties it has been proposed to use chill members immediately beneath the joint to cause the molten welding metal to solidify with a smooth surface, flush with the members joined. Chill members, however, are necessarily large and cumbersome and for this reason they are not adapted for general use or for use in the field.

It has also been proposed to back up the joint with a thin steel backing or lining strip provided with threaded stud bolts and straps for holding and aligning the edges during welding. It has been found, however, that this strip is easily melted or burnt through and that great care is necessary during welding to keep from destroying the strip altogether. The metal of the strip tends to coalesce with or join the molten metal of the weld. The application of such strips also requires considerable time. The nuts on each of the several stud bolts must be carefully drawn up in order to properly align the edges to be joined.

An object of the present invention is the provision of a butt welded joint for metal sheets and pipes in which material of the weld does not substantially protrude from the underside of the joint.

A further object of this invention is the provision of a welding or backing strip of much higher melting point material than the melting point of the material of the weld, adapted to overlap the edges to be joined and provided with projections adapted to frictionally engage the edges to be joined to hold the strip closely against the overlapped portions of said edges when the edges are moved into substantially abutting position.

A further object of this invention is the provision of a welding strip adapted for use in buttweld joining of sheets and pipes, the strip being provided with transverse, angularly disposed projections adapted to engage the edges to be joined and to force the strip against the joint when the edges are moved into abutting position.

A further object of this invention is the provision of an inexpensive and durable butt welded joint for pipe lines which can be easily and quickly made, which offers substantially no obstruction to the fluid piped, or to cleaning devices passed through the pipe, and which is free of pockets in which corrosive materials might collect.

I accomplish these and other objects by the provision of the joint described and illustrated in the accompanying drawings wherein for the purpose of illustration I have shown several forms of a specific embodiment of my invention:

Fig. 1 is a perspective view illustrating one form of my invention;

Fig. 2 is a transverse sectional view taken along line 2—2 of Fig. 3 looking in the direction of the arrows;

Fig. 3 is a longitudinal sectional view taken along line 3—3 of Fig. 2 looking in the direction of the arrows;

Fig. 4 is a perspective view showing a modified form of the invention;

Fig. 5 is a transverse sectional view;

Fig. 6 is an enlarged detail longitudinal sectional view taken along line 6—6 of Fig. 5 looking in the direction of the arrows and shows one method of securing the projections to the welding strips;

Figs. 7, 9, 11, 12, 14, 15, 16, 17, 20, 22, 25 and 29 are enlarged detail longitudinal sectional views of modified forms of welding strips at the joint between the ends of two pipes and illustrates various methods of securing projections to the strips;

Fig. 8 is a transverse sectional view taken along line 8—8 of Fig. 7 looking in the direction of the arrows;

Fig. 10 is a transverse sectional view taken along line 10—10 of Fig. 8 looking in the direction of the arrows;

Fig. 13 is a transverse sectional view taken along line 13—13 of Fig. 12 looking in the direction of the arrows;

Fig. 15 is a transverse sectional view taken along line 15—15 of Fig. 14 looking in the direction of the arrows;

Fig. 18 is a transverse sectional view taken along line 18—18 of Fig. 17 looking in the direction of the arrows;

Fig. 19 is a perspective view of the welding strip shown in Figs. 17 and 18;

Fig. 21 is a perspective view of the welding strip shown in Fig. 20;

Fig. 23 is a transverse sectional view taken along line 23—23 of Fig. 22 looking in the direction of the arrows;

Fig. 24 is a transverse sectional view of a modified form of welding strip and shows a continuous retaining strip for securing a plurality of projections to the welding strip;

Fig. 26 is a transverse sectional view taken along line 26—26 of Fig. 25 looking in the direction of the arrows;

Fig. 27 is a transverse sectional view of a modified form of welding strip and shows a method of securing a continuous projection or clamping strip to the welding strip; and Fig. 28 is an enlarged fragmental perspective view of a continuous projection or clamping strip having openings in the base of the strip through which a retaining strip may be welded to the welding strip.

Referring to the drawings wherein like reference numerals, where applicable, indicate corresponding parts throughout the several views, the numeral 1 indicates a backing strip of thin high melting point metal or alloy, advantageously tungsten, molybdenum; or other metal of much higher melting point than the melting point of the metal of the weld. The melting point of tungsten is about 3450° C. and that of molybdenum about 2500° C. The melting point of common steels as used in pipes and sheet metal, and of welding steels, is much lower; generally between 1400° and 1500° C. Thus at temperatures at which the welding metal and the metal to be joined are melted, the material of the backing strip is quite unaffected. In fact, temperatures at the backing strip may even rise locally to values considerably higher than the welding temperature necessary for welding the pipe, without any danger of distorting, melting or burning through the backing strip. Because of the wide difference in melting points, the backing strip can be made very thin; of a thinness which would cause a strip of ordinary steel to melt or burn through in a short time.

In accordance with the invention the backing strips are supplied in ready cut lengths suitable for use in welding pipes of various sizes, in short tubes or cylinders of the proper diameter or in rolls of several feet each, the required lengths being cut from the rolls as needed. The ends of the pipes A and B to be joined, are first beveled as shown at 2 and 3 respectively to form a welding groove 4 when positioned in abutting relation. Before joining the ends of the pipes the welding strip is coiled around the inside of the pipes to overlap the ends of the pipes and form a bottom or dam for the welding groove, when the pipes are joined. The ends of the welding strip may abut each other or overlap each other. In any event, the strip is sufficiently resilient to remain in position in the pipes by spring pressure against the inner walls. The slight groove formed when the ends of the strip are in abutting relation, or the small opening formed when the ends overlap, does not permit flow of enough welding material into the pipe to cause any substantial interference with the flow of fluid through the pipe or obstruct the passage of cleaning devices. The welding strip being very thin fits closely against the inner walls of the pipe with the result that no substantial pockets are formed at the joint in which corrosive substances might accumulate. It is not necessary to use pipe with belled or otherwise enlarged end portions; ordinary straight-bored pipe can be used. The effective bore of the pipe is not reduced to any appreciable extent. After the welding strip has been positioned in the pipe, welding material 5, which consists generally of mild steel, is supplied to the welding groove in the usual manner, as by means of electricity, an acetylene torch or the like welding. As stated, the welding strip, being of considerably higher melting point than the melting point of the material of the weld, can be made very thin without danger of melting when contacted with the molten welding material.

It is sometimes desirable to position projections on the welding strip to aid in locating the strip in the pipes at the joint and in holding the strips in position during and after welding. Several different forms of projections and methods of securing the projections to the strip are shown in Figs. 4-29 inclusive. Referring to Figs. 4-10 inclusive and Figs. 12-16 inclusive the projection is in the form of a triangularly bent rod 6. Figs. 4 and 5 show the application of a welding strip provided with this type of projection at the joint between the ends of two pipes, while Fig. 6 illustrates one method of securing the projection to the strip, wherein the projection is provided with a round head 7 held to the backing strip by a thin washer or retaining strip 8 of the same material as the welding strip and welded thereto. Figs. 7 and 8 show another method of securing the projection to the strip. The ends of the projection terminate in a T 9 which is held to the backing strip by means of retaining plate 8 also welded to the welding strip. In Figs. 6 and 7, the welding strip is wider than the retaining strip 8 and its outer edges 10 are curved upwardly against the ends of the members to be joined as shown. In Figs. 9 and 10 a modification of the form shown in Fig. 6 is illustrated, in which the backing strip and sides of the washer 8 are curved to press against the walls of the pipes or other members to be joined. Figs. 12 and 13 show the projection 6 secured to the band by means of screw 11. Figs. 14 and 15 show a method of welding the projection to the backing strip wherein a dovetailed recess 12 is provided in the end of the projection to receive welding material for joining it to the strip. In Fig. 16 the projection is butt welded as at 13 to the strip. Fig. 11 shows a wedged shaped projection 14 secured to the band by means of the screw 15.

In Figs. 17 to 29 inclusive the general form of projection differs from the forms previously described in that thin bent strips are used instead of round solid bars. Figs. 17 to 19 inclusive show oppositely disposed serrated strips 16 passing transversely of the band and welded thereto as at 17. Figs. 20 to 24 inclusive show a V shaped projection 18 secured to the band by a rivet 19 as in Figs. 20 and 21 or by a special retaining strip 20 as in Figs. 22, 23 and 24 which is welded intermediate the projections to the band as at 21.

In Figs. 25 to 29 inclusive a continuous V shaped projecting strip 22 running longitudinally of the band is secured to the band by riveting as at 23 or a retaining strip 24 may be welded through openings 25 in the base of the projecting strip to the welding strip. In Fig. 29 the continuous, channeled or V shaped projection is spot welded as at 26 to the welding strip. In this showing the edges to be joined are beveled clear across their face.

It will be seen that the form of the projections are such that they tend to clamp, pinch or force the welding strip against the walls of the members to be joined when the parts are moved into abutting relation as well as center the strip at the joint. The projections of course become embedded in the weld when the joint is welded and for this purpose they may be made of steel rather than of high melting point material such as the material of the welding and retaining strips. When made of common mild steel they fuse and become welded with the material of the weld.

While the description above is primarily directed to the application of the strip in the butt welding of pipes, it is obvious that the strip may also be used in the butt weld joining of flat metal sheets and the like. In Figs. 6, 7, 9, 11, 12, 14, 16, 17, 20, 22, 25 and 29 for instance members 2 and 3 may be considered fragmental sectional views of the edges of two metal sheets to be butt welded and show the application of the welding strip to the joint in making the weld.

Since the strip is of much higher melting point than the material of the weld there is no danger of melting it or burning it. Since it does not fuse or coalesce with the metal of the weld it may, when desirable be easily removed after the joint is welded. The projections on the strip may or may not be made of fusible material.

The welded joint above described is extremely simple in construction and durable in use. It may be quickly made and requires no prior machining or adaptation of the pipes or sheets joined. The ends of the members to be joined are preferably beveled as above described but not necessarily so.

What I claim is:

1. The method of butt welding metal sheets and pipes which comprises beveling the edges to be joined to form a groove to receive welding metal when the edges are positioned in abutting relation, positioning a flat thin metal welding strip of much higher melting point than the material of the weld to overlap said edges, said strip being provided with projections adapted to engage the beveled edges to be joined, moving said edges into substantially abutting engagement whereby said projections are caused to tightly grip said edges and force said strip tightly against the overlapped portion of said edges, and thereafter inserting welding material in said groove to join said edges, the melting point of the material of the strip being high enough to prevent any substantial flow, deformation or disintegration of the strip at temperatures used in welding the joint.

2. A welding strip for butt welding of sheets and tubes comprising a thin narrow metal band of higher melting point material than the material of the weld, said strip being provided with V shaped projections on one face, adapted to frictionally engage the edges of the materials to be joined to hold said strip in position and to force the strip tightly against said joint.

3. A welding strip for butt welding of sheets and pipes comprising a thin narrow metal band of higher melting point material than the material of the weld, said strip being provided with a plurality of projecting rods, each rod being bent to form a triangle in a plane transverse to the longitudinal axis of the strip, said rod being adapted to engage the edges of the materials to be joined to hold said strip in position at the joint and to force the strip tightly against the joint.

4. A welding strip for use in backing during butt welding of pipes or tubes, the abutting ends of which are chamfered to form a V-groove adapted to receive weld material, said strip comprising a substantially circular metal body portion and a plurality of spaced members projecting outwardly therefrom and being adapted to so engage and coact with the chamfered ends of the pipes as to automatically force the body portion of the strip inside the pipe ends tightly against the inner walls of the pipe ends when the abutting ends of the pipes are pressed towards each other.

5. A welding strip for use in butt welding of pipes or tubes the abutting ends of which are shaped to form a groove increasing in width towards the outside and adapted to receive weld material, said strip comprising a circular body member of metal and a plurality of spaced members joined thereto, said members being thin adjacent the band and wider away from the band, and arranged to engage the walls of said groove, so that upon pressing the abutting ends of the pipe together the body member inside the pipe ends is drawn tightly against the inner walls of the pipe ends by the spaced members.

6. A welding strip for butt welding metal elements having the opposed edges shaped to form a triangular groove adapted for the reception of weld material, said strip comprising a body member having a portion adapted to close the bottom of said groove, and another portion adapted to extend into and rest in said groove in engagement with the walls of said groove, whereby upon pushing the opposed edges of the metal elements towards each other, the body member is forced against the bottom of said groove, by wedge action between the walls of the groove and the said portion extending into the groove.

7. A welding strip for use in butt welding metal pieces, the abutting ends of which are so shaped as to form a groove increasing in width upwards and adapted to receive weld material, said strip comprising a band of metal and a plurality of spaced retaining members united to the band, the members having diverging surfaces adapted to engage the walls of said groove and being so arranged that upon pressing the abutting ends of the metal pieces together the band is automatically drawn tightly upwards against the joint, by wedge action between the retaining members and the walls of the groove.

8. A welding strip for butt welding pipes, tubing and the like, comprising a body member having a portion adapted to fit inside the abutting pipe ends, and wedge-like means adapted to extend between the abutting pipe ends and space them apart to form a groove for the reception of weld material, said wedge-like means being adapted to force the body member against the bottom of said groove by wedge action when the abutting pipe ends are pushed toward each other.

9. A welding strip for butt welding of sheets and tubes comprising a thin narrow metal band provided with V-shaped projections on one face, adapted to frictionally engage the edges of the materials to be joined to hold said strip in position and to force the strip tightly against the joint.

10. A welding strip for butt welding of sheets and pipes comprising a thin narrow metal band provided with a plurality of projecting rods, each rod being bent to form a triangle in a place transverse to the logical axis of the strip, said rod being adapted to engage the edges of the materials to be joined to hold said strip in position at the joint and to force the strip tightly against the joint.

ABBOTT A. LANE.